United States Patent
Weichenberger

(10) Patent No.: US 6,944,526 B2
(45) Date of Patent: Sep. 13, 2005

(54) METHOD FOR THE TRANSMISSION OF A SENSOR DATA SIGNAL AND AN ADDITIONAL DATA SIGNAL FROM A SENSOR COMPONENT TO AT LEAST ONE RECEIVER

(75) Inventor: Lothar Weichenberger, Klingsmoos (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 10/476,631

(22) PCT Filed: Apr. 20, 2002

(86) PCT No.: PCT/EP02/04366
§ 371 (c)(1),
(2), (4) Date: Oct. 31, 2003

(87) PCT Pub. No.: WO02/091327
PCT Pub. Date: Nov. 14, 2002

(65) Prior Publication Data
US 2004/0128043 A1 Jul. 1, 2004

(30) Foreign Application Priority Data
May 5, 2001 (DE) .......................................... 101 21 879

(51) Int. Cl.[7] ........................... G08C 15/12; B60R 21/01
(52) U.S. Cl. ........................................... 701/45; 701/46
(58) Field of Search .............................. 701/45, 46, 29; 280/735; 307/10.1

(56) References Cited

U.S. PATENT DOCUMENTS

| | | | |
|---|---|---|---|
| 5,684,338 A | 11/1997 | Linton et al. | |
| 6,256,736 B1 | 7/2001 | Coppersmith et al. | |
| 6,448,671 B1 * | 9/2002 | Wallace et al. | 307/10.1 |
| 6,449,545 B1 | 9/2002 | Nitschke et al. | |
| 6,542,273 B1 * | 4/2003 | Griessbach | 340/438 |
| 2002/0027346 A1 * | 3/2002 | Breed et al. | 280/735 |

FOREIGN PATENT DOCUMENTS

| | | |
|---|---|---|
| DE | 39 08 558 | 9/1990 |
| DE | 42 09 785 | 9/1993 |
| DE | 19634714 | 3/1998 |
| DE | 19813923 | 10/1999 |
| JP | 2000-083159 | 3/2000 |
| WO | WO94/08823 | 4/1994 |

OTHER PUBLICATIONS

D. Ullmann et al.; Side Airbag Sensor in Silicon Micromachining; SAE, Technicl Paper, pp. 9 to 13; Jan., 1999–01–057, R. Bosch GmbH, Reutlingen, Germany.

* cited by examiner

Primary Examiner—Michael J. Zanelli
(74) Attorney, Agent, or Firm—W. F. Fasse; W. G. Fasse

(57) ABSTRACT

A method for the transmission of sensor data from a sensor assembly to one or more receivers is presented, in which, in response to a control signal, additional data are transmitted at least temporarily for a short time instead of the sensor data, whereby only a certain limited value range of the value range that is available for the sensor data transmission is used for the transmission of the additional data, so that even with receivers which do not recognize that the transmitted data are additional data, erroneous functions or malfunctions are to be excluded. Thus, especially that value range of the sensor data signal that is to be attributed to a noise of the quantity to be measured or of the sensor assembly and is therefore not evaluated by the receiver in the normal signal operation, is used for the transmission of the additional data. In occupant protection systems, the safety-uncritical value range of a sensor data signal, which leads to no triggering of the occupant protection system, can correspondingly be used for the transmission of the additional data.

20 Claims, 3 Drawing Sheets

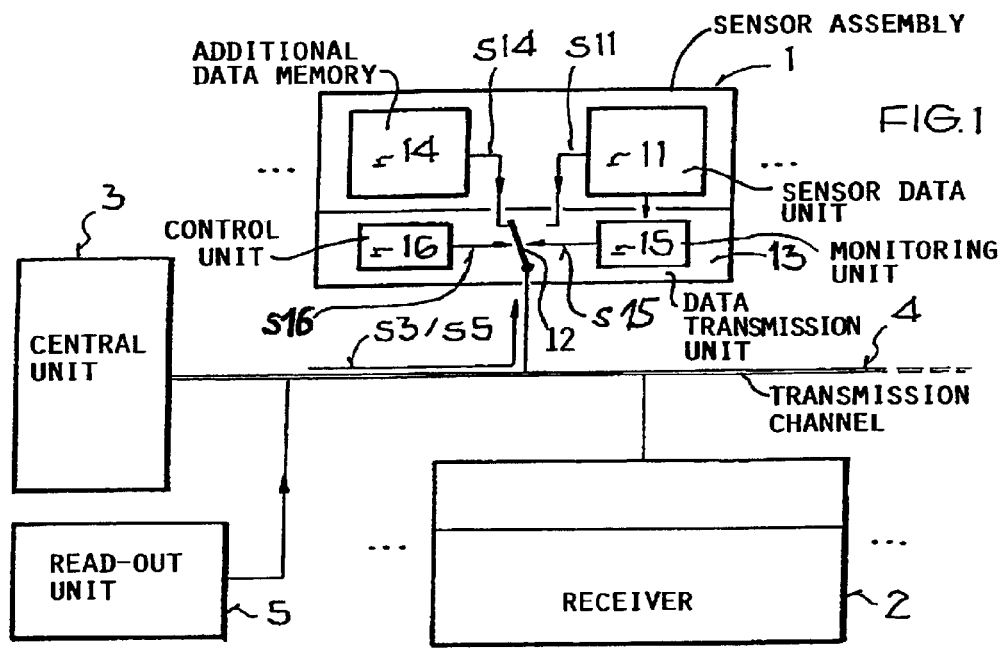
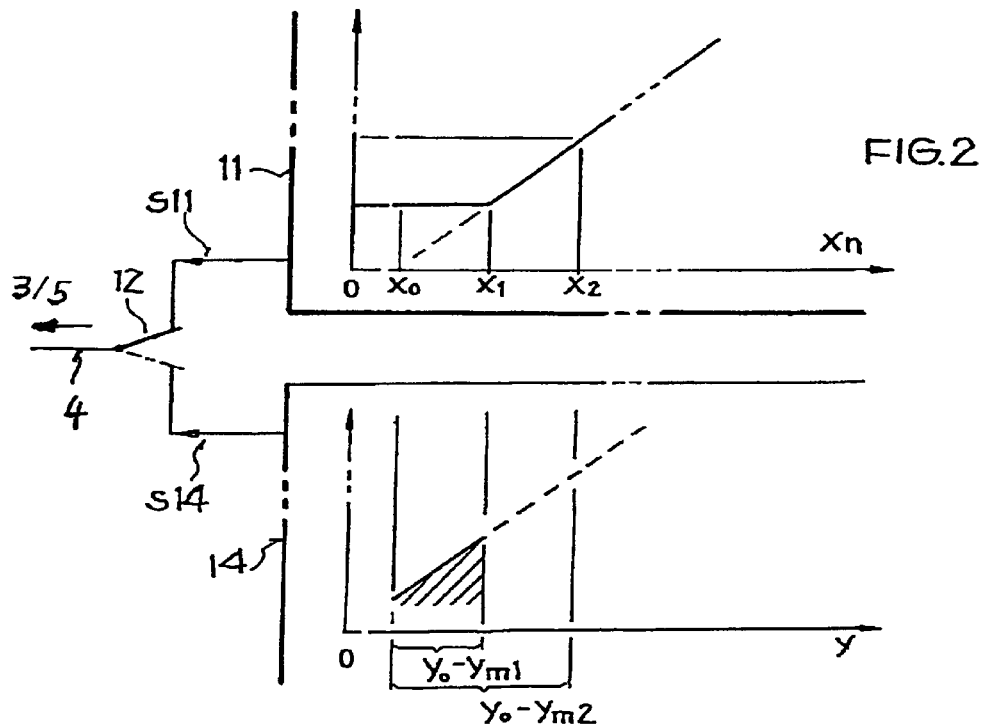

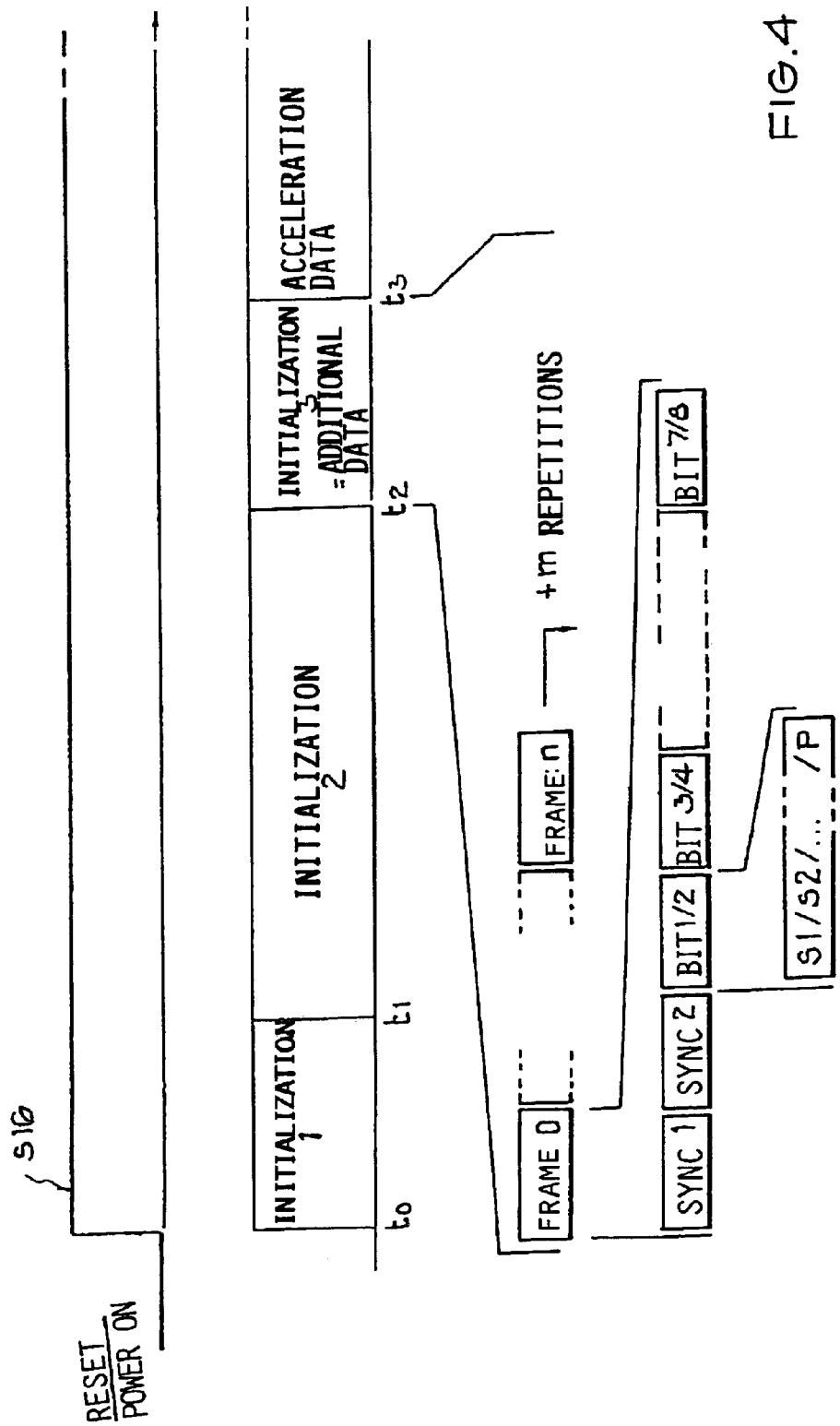

METHOD FOR THE TRANSMISSION OF A SENSOR DATA SIGNAL AND AN ADDITIONAL DATA SIGNAL FROM A SENSOR COMPONENT TO AT LEAST ONE RECEIVER

FIELD OF THE INVENTION

The invention relates to a method for the transmission of a sensor data signal and an additional data signal from a sensor assembly to at least one receiver.

BACKGROUND OF THE INVENTION

Typically, a sensor measures a certain physical quantity and generates a corresponding sensor data signal, which is transmitted from a data transmission unit of the sensor assembly to the receiver, and there, an application unit allocated to the receiver of the sensor data signal is controlled dependent thereon. If, in addition to the sensor data signal, further data, be they control signals for controlling the data transmission or additional or auxiliary data, are to be transmitted, then a different value range of the data signal can be used for this purpose, thus, for example, a higher amplitude for analog signals, or a reserved bit value range for digital signals. As an alternative thereto, there is a possibility of a multiplex operation, in which the value range of the sensor data signal can be used for the additional data signal. In all cases, however, in addition to the sensor assembly as a transmitter, respectively also all of the receivers must recognize this data transmission protocol or the respective type of operation. Especially in sensor data bus systems, in which a plurality of sensor assemblies and receivers are connected together on a bus, therefore an adaptation of all bus participants is necessary, even if such additional data are to be exchanged between only a few participants. A utilization of assemblies of an older generation, i.e. a downward compatibility, is thus excluded. Otherwise, error functions or malfunctions could arise in the receiver or in the application unit, with respect to receivers which do not recognize that the transmitted data are additional data signals.

Such sensor data bus systems are, for example, used in motor vehicles for the acquisition of safety relevant sensor data signals for the controlled activation of occupant protection devices.

In this context, for example, if additional data signals would be transmitted instead of acceleration data signals, and a receiver of an occupant protection device would not recognize this, either because it just did not receive a corresponding control signal due to an interference, or because it is not at all prepared for such a transmission of additional data signals, then there exists the danger of the erroneous triggering of the occupant protection device.

SUMMARY OF THE INVENTION

It is the object of the invention to present a method for the transmission of a sensor data signal and an additional data signal from a sensor assembly to at least one receiver, in which erroneous functions or malfunctions in the receiver are to be excluded.

The above objects have been achieved according to the invention in a method for the transmission of a sensor data signal and an additional data signal from a sensor assembly to at least one receiver of the sensor data signal and one receiver of the additional data signal through a common transmission channel, a) whereby a sensor measures a quantity that is to be measured and generates a corresponding sensor data signal,
b) the receiver of the sensor data signal controls an application unit dependent on the sensor data signal,
c) whereby a total value range of the sensor data signal includes a value range that is uncritical for the control of the application unit,
d) in response to a control signal, a data transmission unit of the sensor assembly at least temporarily for a short time transmits an additional data signal instead of the sensor data signal, whereby the value range that is uncritical for the control of the application unit is used as the signal value range for the additional data signal.

The above objects have further been achieved according to the invention in an acceleration sensor assembly for generating an acceleration signal in an occupant protection system, a) whereby a signal value range is prescribed for a data transmission, this signal value range is divided into a sensor data value range for a sensor data transmission of a sensor data signal comprising an acceleration signal from an acceleration sensor and a control signal value range, that is distinguishable therefrom, for transmission of control signals for controlling of the data transmission,
b) at least one activation unit of at least one occupant protection device is provided, which receives the acceleration signal and decides about the triggering of the occupant protection device(s) dependent on the acceleration signal, whereby
c) the sensor data value range of the acceleration signal comprises a safety-uncritical value range and the activation unit initiates no activation of occupant protection devices of the occupant protection system with values of the acceleration signal in this safety-uncritical value range, and
d) in response to a prescribed control signal, the acceleration sensor transmits additional data in an additional data signal while using exclusively the safety-uncritical value range.

In that context, the basic underlying idea is to use, for the transmission of the additional data signals, only that value range of the sensor data signal that is uncritical for the control of the application unit, whereby a receiver of the sensor data signal, which erroneously interprets the additional data signal as a sensor data signal, will not exhibit any significant erroneous functions or malfunctions.

Thus, an often very considerable portion of the sensor data signal value range, and therewith the transmission capacity, is knowingly dispensed with, for the benefit of the achieved functional security. For this, basically for nearly all data signals, the noise range is always available, namely the value range of the sensor data signal that is attributable to a noise of the quantity to be measured as well as of the sensor assembly. Therefore, this noise range is not evaluated by typical conventional receivers. The useable range of this noise range is in turn limited downwardly only with analog signals due to the noise component additionally arising on the transmission path, which naturally does not apply for digital signal transmission.

Moreover, however, dependent on the respective application, a value range of the sensor data signal can additionally arise, in which similarly no erroneous function or malfunction or fault will occur in the respective application, if additional data signals are transmitted instead of sensor data signals.

This is, for example, the case in such applications in which the sensor data signals are compared with a threshold value and the application unit is only activated for sensor data signals above the threshold value. The usable sensor data signal value range in this context is often considerably larger than the noise range.

A preferred application example arises for a sensor assembly in an occupant protection system for motor vehicles, in which the sensor assembly measures a safety relevant quantity and generates a sensor data signal corresponding to the safety relevant quantity, whereby at least one activation unit of at least one occupant protection device is provided, which receives the sensor data signals and decides about the triggering of the occupant protection device(s) dependent on this sensor data signal. In this context, the sensor data value range of the sensor data signal comprises a safety-uncritical value range in which the activation unit does not initiate an activation of the occupant protection devices. Therefore, exclusively this safety-uncritical value range is used for the transmission of the additional data.

BRIEF DESCRIPTION OF THE DRAWINGS

In the following, the invention shall be further explained in detail in connection with example embodiments and Figures. Short description of the Figures:

FIG. 1 sensor assembly connected to a sensor bus for the transmission of a sensor data signal as well as an additional data signal;

FIG. 2 value range of an analog sensor data signal and of an analog additional data signal;

FIG. 4 structure of the entire data protocol.

Figure 3:
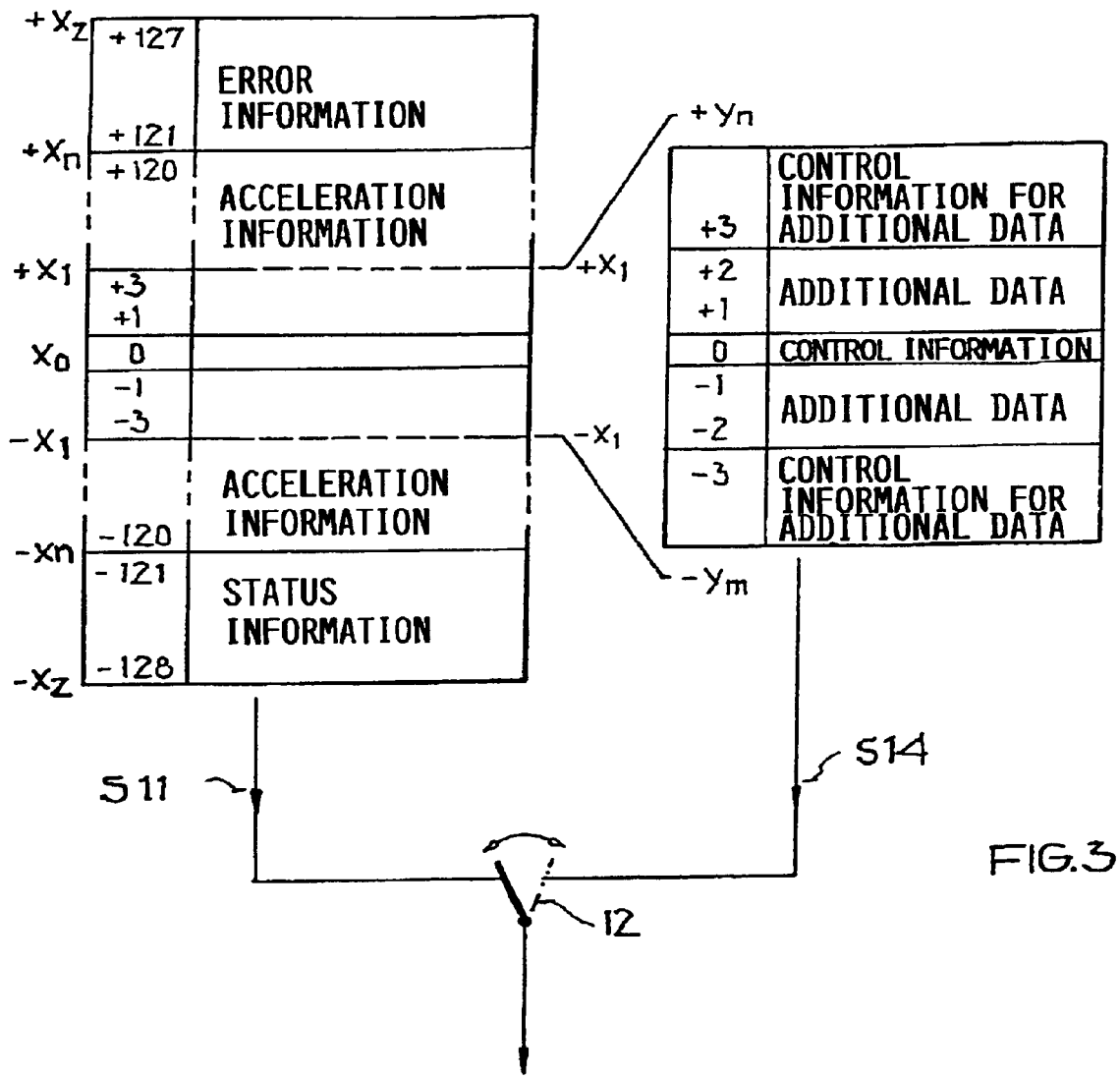
FIG. 3 digital code word value range for sensor data signal and additional data signal of an acceleration sensor assembly.

DETAILED DESCRIPTION OF A PREFERRED EXAMPLE EMBODIMENT AND OF THE BEST MODE OF THE INVENTION

The FIG. 1 shows a sensor assembly 1, which transmits a sensor data signal s11 of a sensor data unit 11, i.e. the actual sensor function, to at least one receiver 2, which controls an application unit, which is not shown in detail, dependent on the sensor data signal s11. Here in this example, an acceleration sensor assembly transmits acceleration data signals to an activation unit of an occupant protection system.

An additional data signal s14 stored in an additional data memory 14 of the sensor assembly is also to be transmitted via the same transmission channel 4.

In this example as a starting point, it shall be understood that the receiver 2 is a typical conventional activation unit of an occupant protection system and is not prepared for the reception of additional data. In this example, a central unit 3 as well as a read-out unit 5, which is externally connectable via a contact and which serves for reading out the additional data, are also connected with the transmission channel 4.

In response to a control signal, which here originates as s5 from the read-out unit 5, an additional data signal s14 is transmitted at least temporarily for a short time instead of the sensor data signal s11. The receiver 2, which is not prepared for the reception of additional data, will consequently interpret this additional data signal s14 as a sensor data signal and will evaluate it as such. However, only the value range that is uncritical for the control of the application unit, here the occupant protection device, is used as the signal value range for the additional data signal s14, so that the receiver 2 is not interrupted or interfered with thereby. On the other hand, the read-out unit 5 can receive and evaluate the additional data signal as such.

The control signal for the switching over (12) from the sensor data signal s11 to the additional data signal s14 can also be generated by the central unit 3 in the form of a signal s3, for example when this unit requires the additional data, whereby the type of the control signal does not necessarily have to be a digital data signal, which is transmitted explicitly and solely for this purpose, but rather, a control signal for still other functions can also be used, or such a control signal for the switch-over switch 12 can arise from certain functional or operating conditions, for example an interrupt or a power-on.

Moreover, the control signal can also be generated by the sensor 1 itself, if, for example, this sensor always transmits the additional data in response to an internal reset of the sensor assembly, for example after a power-on, or in a fixed time rhythm prescribed by means of a control unit 16, or if applicable also an adjustable fixed time rhythm.

Moreover, it is also conceivable to provide a request or interrogation by a receiver 2.x of an application unit, which is already set up for the reception of additional data signals.

Thus, the manner of the incitation or initiation of the switching-over to the transmission of the additional data signal s14 instead of the sensor data signal s11 can be very flexibly adapted for the respective application situation.

The data transmission unit 13 of the sensor assembly 1 as a preferred embodiment further comprises a monitoring unit 15, which detects the present actual values of the sensor data signal s11 at least during the transmission of the additional data signal s14, compares these present actual values with prescribed nominal or rated values, and upon exceeding these nominal or rated values terminates the transmission of the additional data signal s14 and switches to the transmission of the sensor data signal s11, in other words automatically again switches over the switch 12. Thereby it is ensured that no sensor data signals that are determinative or significant for the control of the application unit become lost during the transmission of additional data.

FIG. 2 sketches, in the manner of an example, the value range of an analog sensor data signal x0 to xn, whereby the value range x0–x1 corresponds to the noise range of the sensor data signal, which is to be attributed to a noise of the quantity to be measured as well as of the sensor assembly.

This noise range x0–x1 is therefore not evaluated by the receiver 2, for example is eliminated by comparison with a lower threshold. This noise range is thus completely unmeaningful for the control of the application unit and therefore uncritical.

Therefore, this noise range of x0–x1 is used as the signal value range y0–ym for the analog additional data signal s14 that is to be transmitted, so that the receiver 2, which, of course, cannot distinguish the sensor and additional data signals from each other, only recognizes a negligible noise therein. The read-out unit 5, however, is exactly optimized to this signal range, which is typically the lower signal range for analog signals, and can therefore receive the additional data signal s14. The value range of 0 to x0 lying therebelow is not utilized, due to a possible noise on the transmission channel in the analog signal transmission.

On the other hand, if an application is present, in which the receiver 2 compares the sensor data signal s11 with a threshold value x2, and only activates the application unit for a sensor data signal s11 exceeding the threshold value x2, the value range below this threshold value x0–x2 can be used as the signal value range y0–ym2 for the additional data signal s14. This expanded utilization of the sensor data signal value range is possible for a plurality of application units in that context, especially for failure or fault diagnosis devices that are only active upon the occurrence of an error or fault, for accident or crash sensors, which also must only activate certain application units upon or following a threshold value, whereby the threshold value x2 and the quantity of the additional data signals s14 to be distributed thereupon are defined in an application specific manner.

FIG. 3 shows a method in which the data transmission of the sensor data and the additional data is carried out in digital code words. Here, the code words are formed in the manner of an 8-bit sequence, which corresponds to 256 code words. Due to the application specific peculiarity of the sensor data signal to be transmitted, here of an acceleration signal provided with a sign, the code words are not represented from 0 to 256, but rather from −128 to +127, which, however, is initially unimportant or not meaningful for the method.

Of the quantity of 256 code words, one portion, here from +127 to +121 as well as from −121 to −128, is provided for the transmission of control signals (error information and status information), and the other portion from +120 to −120 is provided for the transmission of sensor data. Moreover, of the code words (+120 to −120) used for the sensor data transmission, in turn a portion thereof corresponds to sensor data that are uncritical for the control of the application unit, here due to particularly strict requirements these are limited to code words from +3 to −3. Only this portion of the code words is used for the transmission of the additional data.

In this example in FIG. 3, namely the sensor data signal of an acceleration sensor are to be transmitted, whereby corresponding values of the acceleration are allocated to the code words +120 to −120, thus the earth's gravitational acceleration g just corresponds exactly to the code word 1. In this context, acceleration sensors typically acquire or detect their values with a sign, which is also especially important for the evaluation in the field of the crash recognition for the control of occupant protection systems. Thus, the portion of the code words used for the transmission of the additional data corresponds exactly once to the range from +3 g to −3 g, namely an extremely small acceleration signal value range that is uncritical for the crash recognition. In this context, however, a particularity of the crash recognition has still further been taken into consideration, namely that the activation unit, for deciding about the activation of the occupant protection device(s) carries out an integration of the acceleration signal and a comparison of the acceleration integral signal with an activation threshold. This integration namely has as a result that upon a repeated transmission of the respective largest values of a value range, these largest values as the acceleration signal itself will not yet reach a triggering threshold, but the acceleration integral signal resulting therefrom could, however, quite well reach the activation threshold.

The safety-uncritical value range that is used for the transmission of the additional data is therefore determined so that even with an integration of the largest values from the safety-uncritical value range, the activation threshold will not be reached under any circumstances, and finally it is ensured, that the data transmission unit transmits the additional data signal s14 while using exclusively a safety-uncritical value range (x0–x1 corresponds here to +3 g to −3 g), in that an activation of the occupant protection devices by a receiver, which takes the additional data to be sensor data, is excluded.

In this example the method is used to interrogate or to transmit sensor production data, especially an individual sensor assembly number, with each reset of the sensor. Since the sensor production data are, however, relatively extensive or voluminous, it is necessary to carry out a transmission of the additional data in a sequence of several code words.

In order to once again avoid errors or faults in that context, the use of position numbers is necessary, so that in addition to the actual additional useful data also these additional control data must be transmitted, and the quantity of the available code words for the additional useful data is further limited.

In that context it must further be paid attention to, that a sequence of code words, even if one sequences these one after another in the worst possible conceivable arrangement, will in no case reach or achieve the triggering of the occupant safety devices.

FIG. 4 sketches the construction as well as the fragmentation of the entire data transmission protocol, whereby in this application, in response to a reset, whether this occurred by itself internally from the sensor assembly 1 or externally due to a control signal from the central unit 3 or the read-out unit 5, at t0 first an initialization 1 and 2 occurs, to which the acceleration data would be joined at t2 with typical conventional acceleration sensor assemblies. Here, however, first the additional data signals are transmitted between t2 and t3, whereby this can give rise to no erroneous or faulty triggerings even with receivers without any recognition of this new data protocol, due to the use of exclusively the sensor data range which is uncritical for the activation unit of the occupant protection device, for the transmission of the additional data. In this context, the additional data are packed into n frames, which are transmitted in m repetitions, whereby the receivers of the additional data can still reconstruct the additional data later due to these repetitions, even in the event of a short temporary interference on the sensor bus 4. For this, the frames comprise two 8-bit synchronization words and subsequently four data words each of 8-bits, whereby in total only respectively 2-bit useful data are contained therein, and the other bits are used for start bits and parity checking. Nonetheless, in a few hundred milliseconds, quantities of additional data larger than the sensor production data can be transmitted over the existing transmission channel 4.

Respectively two of the code words 0, 3 and −3 are used for the synchronization, whereby however the combinations (+3, +3) and (−3, −3) are excluded, in order to completely exclude the possibility that the critical value range would be reached in an integration.

A frame can therefore maximally take on the following average values:

| Sync 1 | Sync 2 | Data 1 | Data 2 | Data 3 | Data 4 | ø | Sync 1 | Sync 2 | Data 1 | Data 2 | Data 3 | Data 4 | ø |
|---|---|---|---|---|---|---|---|---|---|---|---|---|---|
| 0 | 0 | −2 | −2 | −2 | −2 | −1.2 | 0 | 0 | 2 | 2 | 2 | 2 | 1.2 |
| 0 | 3 | −2 | −2 | −2 | −2 | −0.6 | 0 | 3 | 2 | 2 | 2 | 2 | 1.8 |
| 0 | −3 | −2 | −2 | −2 | −2 | −1.8 | 0 | −3 | 2 | 2 | 2 | 2 | 0.6 |
| 3 | −3 | −2 | −2 | −2 | −2 | −1.2 | 3 | −3 | 2 | 2 | 2 | 2 | 1.2 |

-continued

| Sync 1 | Sync 2 | Data 1 | Data 2 | Data 3 | Data 4 | ø | Sync 1 | Sync 2 | Data 1 | Data 2 | Data 3 | Data 4 | ø |
|---|---|---|---|---|---|---|---|---|---|---|---|---|---|
| −3 | 0 | −2 | −2 | −2 | −2 | −1.8 | −3 | 0 | 2 | 2 | 2 | 2 | 0.6 |
| 3 | 0 | −2 | −2 | −2 | −2 | −0.2 | 3 | 0 | 2 | 2 | 2 | 2 | 1.8 |
| | | ø Over Frame = −1.333 | | | | | | | ø Over Frame = +1.333 | | | | |

In the average, with correspondingly distributed data bits, the additional data signal is approximately free of steady components. Thus, an erroneous or faulty triggering can be excluded quite securely.

Moreover, a completely offset-free encoding of the additional data signal is possible, in that the additional data are transmitted once normally and once inverted within a frame or scope that is to be agreed upon. For this purpose, of the reserved synchronization words "+3" and "−3", one of these would be used as a signal for the respective inversion condition. If, for particular applications, still fewer distinguishable code words are available in the uncritical value range, there additionally exists the possibility, in the limiting case, to transmit the corresponding additional data signals by a 1-bit sequence formed by means of polynomial coding, and subsequently to reconstruct the additional data signals by means of the polynomial function from the uncritical value range that is, if applicable, to be interpreted as noise.

Since the resets may also be triggered by the sensor assembly itself, it cannot be excluded, that the transmission of the additional data would take place at a point in time at which the sensor data signal itself would take on safety critical values. Therefore, the data transmission unit 13 of the acceleration sensor assembly of an occupant protection system comprises a monitoring unit 15, which detects the present actual values of the sensor data signal s11 at least during the transmission of the additional data signal s14, compares these present actual values with prescribed nominal or rated values, and upon exceeding these nominal or rated values terminates the transmission of the additional data signals s14 and switches to the transmission of the sensor data signals s11.

What is claimed is:

1. Method for the transmission of a sensor a data signal (s11) and an additional data signal (s14) from a sensor assembly (1) to at least one receiver (2) of the sensor data signal and one receiver (3,5) of the additional data signal through a common transmission channel (4),
   a) whereby a sensor (11) measures a quantity that is to be measured and generates a corresponding sensor data signal,
   b) the receiver (2) of the sensor data signal (s11) controls an application unit dependent on the sensor data signal, wherein the receiver (2) of the sensor data signal compares the sensor data signal with a threshold value (x2), and activates the application unit only if the sensor data signal (s11) exceeds the threshold value (x2),
   c) whereby a total value range of the sensor data signal (x0–xn) includes a value range (x0–x1) that is uncritical for the control of the application unit,
   d) in response to a control signal (s3/s5/s15/sl6/Uon), a data transmission unit (13) of the sensor assembly (1) at least temporarily for a short time transmits an additional data signal (s14) instead of the sensor data signal (s11), whereby the value range that is below the threshold value and that is uncritical for the control of the application unit is used as the signal value range for the additional data signal (s14).

2. Method according to claim 1, in which a certain value range (x0–x1) of the sensor data signal (s11) as a noise range is attributable to a noise of the quantity to be measured as well as of the sensor assembly, and the noise range (x0–x1) is used as the signal value range (y0–ym) for the additional data signal (s14).

3. Method according to claim 1, using the sensor assembly (1) in an occupant protection system for a motor vehicle, wherein
   e) the sensor assembly (1) measures a safety relevant quantity and generates the sensor data signal (s11) corresponding to the safety relevant quantity,
   f) there is provided at least one activation unit (2) as the receiver (2) of at least one occupant protection device as the application unit, wherein the activation unit(s) receives the sensor data signal (s11) and decides about the triggering of the occupant protection device(s) dependent on this sensor data signal (s11), whereby
   g) the total value range (x0–xn) of the sensor data signal (s11) includes a safety-uncritical value range (x0–x1) as the value range that is uncritical, and the activation unit initiates no activation of the occupant protection device(s) when the sensor data signal (s11) is in this safety-uncritical value range (x0–x1), and
   h) in response to a prescribed control signal (s3, s5) as the control signal, the data transmission unit transmits the additional data signal (s14) while using exclusively the safety-uncritical value range (x0–x1) as the signal value range for the additional data signal.

4. Method according to claim 3, whereby
   i) the sensor (11) is an acceleration sensor, the activation unit for the decision about the activation of the occupant protection device(s) carries out an integration of the acceleration signal and a comparison of the integrated acceleration signal with an activation threshold and
   j) the safety-uncritical value range used for transmission of the additional data signal is determined so that the activation threshold will in no case be reached even with an integration of the largest values from the safety-uncritical value range.

5. Method according to claim 4, whereby the transmission of the additional data signal is carried out in a sequence of several code words and the code words are in turn divided into additional control data and additional user data.

6. Method according to claim 1, in which the data transmission unit (13) comprises a monitoring unit (15), which detects the present actual values of the sensor data signal (s11) at least during the transmission of the additional data signal (s14), compares the present actual values with prescribed nominal values, and upon exceeding these nominal values terminates the transmission of the additional data signal (s14) and switches to the transmission of the sensor data signal (s11).

7. Method according to claim 1, in which the data transmission is achieved in digital code words,
   e) whereby among the code words, one portion is provided for the transmission of control signals and another portion is provided for the transmission of sensor data,
   f) of the code words used for the sensor data transmission, in turn an uncritical portion corresponds to sensor data that are uncritical for the control of the application unit, and
   g) this uncritical portion of the code words is used for the transmission of the additional data.

8. Use of the method according to claim 1 for detecting sensor production data including an individual sensor assembly number.

9. Method according to claim 1, wherein the value range that is uncritical for the control of the application unit is a value range in which there will be no erroneous function, no malfunction and no fault in the operation of the application unit when the additional data signal is transmitted instead of the sensor data signal with the value range that is uncritical for the control of the application unit being used as the signal value range for the additional data signal.

10. Acceleration sensor assembly for generating an acceleration signal in an occupant protection system,
   a) whereby a signal value range (+127 to −128) is prescribed for a data transmission, this signal value range is divided into a sensor data value range (+120 to −120) for a sensor data transmission of a sensor data signal comprising an acceleration signal (S11) from an acceleration sensor and a control signal value range (+127 to +121 as well as −121 to −128), that is distinguishable therefrom, for transmission of control signals for controlling of the data transmission,
   b) at least one activation unit of at least one occupant protection device is provided, which receives the acceleration signal (s11) and decides about the triggering of the occupant protection device(s) dependent on the acceleration signal (s11), whereby
   c) the sensor data value range (+120 to −120) of the acceleration signal (s11) comprises a safety-uncritical value range (+3 to −3) and the activation unit initiates no activation of the occupant protection device with values of the acceleration signal in this safety-uncritical value range (+3 to −3), and
   d) in response to a prescribed control signal, the acceleration sensor transmits additional data (s14) while using exclusively the safety-uncritical value range (+3 to −3).

11. Acceleration sensor assembly according to claim 10, which switches front the transmission of the sensor data signal (s11) to the transmission of the additional data (s14) in response to a command of a read-out unit (5) or of a central unit (3) of the occupant protection system.

12. Acceleration sensor assembly according to claim 10, which, in response to a reset that is externally generated from a central unit (3) of the occupant protection system as well as in response to a reset that is internally generated from the acceleration sensor assembly itself, after an initialization signal, first transmits the additional data (s14) and subsequently switches (12) to the transmission of the sensor data signal (s11).

13. A signal transmission method comprising the steps:
   a) with a sensor of a sensor assembly, measuring a quantity to be measured and generating a sensor data signal containing sensor data indicative of said quantity in a first value range and in a second value range;
   b) transmitting said sensor data signal via a transmission channel;
   c) receiving said sensor data signal via said transmission channel in a first receiver;
   d) with said first receiver, comparing said sensor data to a threshold, controlling an application unit in response to and dependent on said sensor data in said first value range only if said sensor data exceed said threshold, and not controlling said application unit in response to said sensor data in said second value range which is a range of said sensor data that is at or below said threshold and is uncritical for controlling said application unit;
   e) temporarily interrupting said transmitting of said sensor data signal and instead thereof transmitting, from said sensor assembly via said transmission channel, an additional data signal containing additional data in said second value range.

14. The signal transmission method according to claim 13, further comprising receiving said additional data signal and evaluating said additional data with a second receiver, as well as receiving said additional data signal with said first receiver and not controlling said application unit in response to said additional data.

15. The signal transmission method according to claim 13, wherein said second value range corresponds to a noise range of said sensor data signal.

16. The signal transmission method according to claim 13, wherein:
   said sensor assembly is a sensor assembly of a motor vehicle occupant protection system that further includes an occupant protection device as said application unit;
   said quantity measured by said sensor is a safety-relevant quantity; and
   said first receiver is a receiver of an activation unit of said occupant protection device, which controls a triggering of said occupant protection device in response to and dependent on said sensor data, in that said activation unit triggers said occupant protection device if said sensor data are within said first value range and does not trigger said occupant protection device if said sensor data are within said second value range.

17. The signal transmission method according to claim 16, wherein:
   said sensor is an acceleration sensor and generates acceleration data as said sensor data;
   said activation unit further performs integration of said sensor data signal to produce an integrated signal, and further triggers said occupant protection device if said integrated signal exceeds an integral threshold; and
   said second value range is limited so that even said integration of maximum values in said second value range will not produce said integrated signal exceeding said integral threshold.

18. The signal transmission method according to claim 13, further comprising:
   during said step e), monitoring said sensor data signal and comparing said sensor data to at least one prescribed nominal value; and
   if said sensor data exceed said at least one prescribed nominal value during said step e), then terminating said transmitting of said additional data signal and again performing said transmitting of said sensor data signal.

19. The signal transmission method according to claim 13, wherein:

said transmitting of said sensor data signal comprises encoding and transmitting said sensor data in said first value range with a first set of digital code words and encoding and transmitting said sensor data in said second value range with a second set of digital code words;

said method further comprises encoding and transmitting control signals with a third set of digital code words; and said transmitting of said additional data signal comprises encoding and transmitting said additional data with said second set of digital code words.

20. A motor vehicle occupant protection system, comprising:

an acceleration sensor arrangement adapted to measure an acceleration and corresponding thereto produce acceleration data respectively an first and second value ranges;

an additional data unit adapted to provide additional data in said second value range;

a transmitter that is connected at least selectively to said acceleration sensor arrangement and said additional data unit, and that is adapted to selectively transmit said acceleration data or said additional data via a transmission channel;

an occupant protection device; and an activation unit that is connected to said occupant protection device, and that includes a receiver connected via said transmission channel to said transmitter, and that is adapted to trigger an activation of said occupant protection device in response to said acceleration data in said first value range and not trigger said activation of said occupant protection device in response to said acceleration data and said additional data respectively in said second value range.

* * * * *

UNITED STATES PATENT AND TRADEMARK OFFICE
CERTIFICATE OF CORRECTION

PATENT NO. : 6,944,526 B2
DATED : September 13, 2005
INVENTOR(S) : Weichenberger It is certified that error appears in the above-identified patent and that said Letters Patent is hereby corrected as shown below:

Column 1,
Line 13, replace "OF THE INVENTION" by -- INFORMATION --;

Column 7,
Line 44, after "sensor", delete "a";
Line 63, between "d)" and "in", insert a space;

Column 9,
Line 51, after "switches", replace "front" by -- from --;

Column 11,
Line 17, after "respectively", replace "an" by -- in --.

Signed and Sealed this

Twenty-fourth Day of January, 2006

JON W. DUDAS
*Director of the United States Patent and Trademark Office*